United States Patent
Lei et al.

(10) Patent No.: US 7,978,917 B2
(45) Date of Patent: Jul. 12, 2011

(54) METHOD AND SYSTEM FOR PROCESSING VIDEO DATA INCLUDING FOREGROUND EXTRACTION

(75) Inventors: Bangjun Lei, Ipswich (GB); Li-Qun Xu, Ipswich (GB)

(73) Assignee: British Telecommunications public limited company, London (GB)

( * ) Notice: Subject to any disclaimer, the term of this patent is extended or adjusted under 35 U.S.C. 154(b) by 1108 days.

(21) Appl. No.: 11/666,294

(22) PCT Filed: Oct. 24, 2005

(86) PCT No.: PCT/GB2005/004111
§ 371 (c)(1),
(2), (4) Date: Apr. 26, 2007

(87) PCT Pub. No.: WO2006/046021
PCT Pub. Date: May 4, 2006

(65) Prior Publication Data
US 2008/0285859 A1 Nov. 20, 2008

(30) Foreign Application Priority Data

Oct. 28, 2004 (GB) .................................. 0424030.5

(51) Int. Cl.
*G06K 9/62* (2006.01)
*G06K 9/34* (2006.01)
*G06K 9/46* (2006.01)
*G06K 9/66* (2006.01)
*G06K 9/00* (2006.01)
*G06K 9/36* (2006.01)
*H04N 7/12* (2006.01)

(52) U.S. Cl. ........ 382/224; 382/225; 382/103; 382/173; 382/174; 382/180; 382/190; 382/283; 375/240.08

(58) Field of Classification Search .................. None
See application file for complete search history.

(56) References Cited

U.S. PATENT DOCUMENTS
5,099,324 A  3/1992  Abe

FOREIGN PATENT DOCUMENTS
GB       2 399 629 A      9/2004
(Continued)

OTHER PUBLICATIONS
International Search Report mailed Jan. 5, 2006 in International Application No. PCT/GB2005/004111.
(Continued)

*Primary Examiner* — Tom Y Lu
*Assistant Examiner* — Thomas A Conway
(74) *Attorney, Agent, or Firm* — Nixon & Vanderhye P.C.

(57) ABSTRACT

In an intelligent video surveillance system, video processing software performs a number of operations on video data received from a camera, including foreground extraction, shadow removal and object tracking. The foreground extraction stage classifies each pixel of a received frame as representing either foreground or background. Since shadow regions can be wrongly classified as foreground, a two-branch shadow removal operation is employed, comprising weak shadow removal (32) and strong shadow removal (33). The purpose of weak shadow removal (32) is to remove only the most severe shadows in each frame. Conversely, the purpose of strong shadow removal (33) is to remove substantially every shadow present in each frame. By comparing the overlap of foreground regions in the two resulting images, it is possible to identify foreground regions that have fragmented due to strong shadow removal, and thereafter classify them as representing a common foreground object. Foreground objects are better defined in terms of their shape and subsequent processing stages will not treat fragmented regions as representing separate objects.

12 Claims, 13 Drawing Sheets

FOREIGN PATENT DOCUMENTS

WO  WO 97/16926  5/1997

OTHER PUBLICATIONS

UK Search Report dated Feb. 9, 2005 in Application No. GB 0424030.5.

Xu et al., "Segmentation and Tracking of Multiple Moving Objects for Intelligent Video Analysis," BT Technology Journal, vol. 22, No. 3, Jul. 2004, pp. 140-150.

Prati et al., "Detecting Moving Shadows: Algorithms and Evaluation," IEEE Transactions on Pattern Analysis and Machine Intelligence, vol. 25, No. 7, Jul. 2003, pp. 918-923.

Cucchiara et al., "Detecting Moving Objects, Ghosts, and Shadows in Video Streams," IEEE Transactions on Pattern Analysis and Machine Intelligence, vol. 25, No. 10, Oct. 2003, pp. 1-6.

Lou et al., "An Illumination Invariant Change Detection Algorithm," ACCV2002: The 5th Asian Conference on Computer Vision, Jan. 23-25, 2002, Melbourne, Australia, pp. 1-6.

Stauffer et al., "Learning Patterns of Activity Using Real-Time Tracking," IEEE Transactions on Pattern Analysis and Machine Intelligence, vol. 22, No. 8, Aug. 2000, pp. 747-757.

Horprasert et al., "A Statistical Approach for Real-Time Robust Background Subtraction and Shadow Detection," IEEE ICCV Frame Rate Workshop, 1999, pp. 1-19.

METHOD AND SYSTEM FOR PROCESSING VIDEO DATA INCLUDING FOREGROUND EXTRACTION

This application is the US national phase of international application PCT/GB2005/004111 filed 24 Oct. 2005 which designated the U.S. and claims benefit of GB 0424030.5, dated 28 Oct. 2004, the entire content of which is hereby incorporated by reference.

This invention relates to a method and system for processing video data, particularly, though not exclusively, in an intelligent video system.

Intelligent video systems are known in the art. Generally, such systems receive video frames as input, and attempt to detect objects of interest within the image, such as moving objects or the like, using background subtraction techniques to distinguish the objects from the background. Other techniques, e.g. motion-based detection techniques, may also be used. Having detected an object within a single input frame, the system may further act to track detected objects from frame to frame using some characteristic features of the detected objects.

A typical intelligent video system comprises a number of processing stages, as shown in FIG. 1. In a background learning stage 1, a background model is established using an initial segment of video data. Since a background scene will generally remain stationary compared with objects in the foreground, this stage generates a background model in which no moving foreground objects should be visible. In a second stage 3, foreground extraction and background adaptation is performed on each incoming video frame. The incoming frame is compared with the background model to determine which image pixels represent foreground objects and which represent background. Each pixel is classified accordingly and the resultant image is referred to as an object mask. Small changes in the background model are also updated adaptively. In a third stage 5, foreground regions identified in the object mask are tracked from frame to frame. A correspondence is established between foreground objects in the current frame and those already tracked in previous frames. A trajectory database is maintained so that the tracking history of each foreground object is available to higher-level applications which may, for example, display a trail line indicating the cumulative path taken by one or more foreground objects in the video. An object classification application may be employed to compare the shape of each foreground object with a database of real-world objects. If a match is found, the foreground object is classified appropriately, e.g. as a 'person' or 'vehicle'.

After processing each frame, a validity check is usually performed on the background model to ensure it is still valid. Significant or sudden changes may require a new background model to be learned.

Intelligent video systems are advantageously used in video surveillance. In many surveillance situations, it is not practical for a human operator to simultaneously monitor a large number of video screens. By identifying objects and monitoring their respective movements over time, it is not necessary for the operator to constantly monitor a particular display. If an event occurs whilst the operator is not monitoring the display, the cumulative path taken by an object is viewable and the video system can also be used off-line to review the event.

One known intelligent video system is disclosed in US Patent Application Publication No. 2003/0053659 A1.

A known problem in the prior art is caused by the appearance of shadows in the incoming video. Normally a shadow will cause an image region to appear darker than its true intensity. Thus, in the foreground extraction stage, a cast shadow region may be incorrectly detected as foreground when, in fact, the pixels of that region actually represent background. It follows that shadows can cause the object mask from the foreground extraction stage 3 to show a distorted representation of a foreground shape. This has obvious drawbacks in subsequent processing stages of the video system, particularly if the stage needs to identify an object's shape.

A similar problem is caused by the appearance of highlights. In this case, highlights will cause an image region to appear lighter than its true intensity.

It has been proposed to use colour constancy and/or texture information to identify and remove shadows. However, such techniques have disadvantages. In ensuring that most, if not all, shadows are removed, it is possible for true foreground regions to be removed also. This is a particular problem with self-shadows, i.e. shadows cast by an object onto itself. The result is an image in which foreground objects appear fragmented. Subsequent processing stages may treat each fragmented part as a separate object.

A known shadow removal method is disclosed by Horprasert et al in 'A Statistical Approach for Real-Time Robust Background Subtraction and Shadow Detection', IEEE ICCV Frame Rate Workshop, 1999.

According to a first aspect of the invention, there is provided a method of processing data representing pixels of a video frame, the pixels having been pre-classified as belonging either to a foreground or background region, the method comprising: (a) identifying, in the video frame, a region that includes two or more adjoining foreground pixels; (b) identifying, in the video frame, one or more foreground pixels as being candidates for re-classification by means of using a predetermined algorithm; (c) re-classifying the candidate pixels as background pixels and generating a comparison frame including said re-classified pixels; (d) identifying, from the comparison frame, foreground pixels whose respective frame position is within the region identified in step (a); and (d) classifying foreground pixels identified in step (d) as representing a common foreground object.

The method provides an advantageous way of re-classifying foreground pixels as background pixels, in, for example, a shadow removal operation. By comparing the overlap of foreground regions before and after re-classification, it is possible to identify foreground regions that have fragmented and thereafter classify them as representing a common (i.e. the same) foreground object. Foreground objects are better defined in terms of their shape and subsequent processing stages will not treat fragmented regions as separate objects.

The method offers particular advantages in video surveillance. Data representing a plurality of video frames is sent from a source, such as a video camera, to a computer system arranged to perform the above-mentioned steps. The steps can be performed in real time and the processed image data displayed on a screen.

The method is not limited to video surveillance applications. Indeed, the method can be used in any application requiring the extraction of foreground regions from the background. A virtual reality (VR) system is another example of an application that utilises foreground extraction.

In the specification, foreground pixels are considered to be adjoining if their respective positions in the frame are next to each other, regardless of direction.

Preferably, step (b) includes identifying one or more foreground pixels having a luminance ($Y_f$) different from the luminance ($Y_b$) of a corresponding reference pixel occupying a reference frame, assigning a parameter to the or each identified pixel based on a predetermined relationship between colour components of the candidate pixel and colour components of the reference pixel, and comparing the parameter against a range of values indicating whether the pixel should be classified as a candidate pixel.

The reference frame may comprise a stored background frame acquired from a background learning operation.

The above-mentioned parameter may be given by:

$$\frac{R_f R_b + G_f G_b + B_f B_b}{R_b^2 + G_b^2 + B_b^2}$$

where $R_f$, $G_f$, $B_f$ represent, respectively, red, green and blue colour components of a foreground pixel, and $R_b$, $G_b$, $B_b$ represent, respectively, red, green and blue colour components of the reference pixel.

An alternative, more complex expression, may be used for the numerical parameter, as will be described in the specific description.

In an alternative embodiment, step (b) includes identifying one or more foreground pixels having a luminance ($Y_f$) different from the luminance ($Y_b$) of a corresponding reference pixel occupying a reference frame, assigning first and second parameters to the or each identified pixel based on different respective first and second relationships between colour components of the candidate pixel and colour components of the reference pixel, and comparing the first and second parameters against respective first and second ranges of values indicating whether the pixel should be classified as a candidate pixel.

In this alternative embodiment, the first parameter is given by:

$$\frac{\alpha^2 \cdot R_f \cdot R_b + \beta^2 \cdot G_f \cdot G_b + \gamma^2 \cdot B_f \cdot B_b}{\alpha^2 \cdot R_b^2 + \beta^2 \cdot G_b^2 + \gamma^2 \cdot B_b^2}$$

where $\alpha$, $\beta$ and $\gamma$ are luminance coefficients.

The region identified in step (a) preferably comprises a rectangular pixel array, the size of which is sufficient to include each adjoining foreground pixel. Preferably, each edge of the array includes at least one of the adjoining pixels.

According to a second aspect of the invention, there is provided a method of processing data representing pixels of a video frame, the pixels having been pre-classified as belonging either to a foreground or background region, the method comprising: (a) identifying one or more foreground pixels as being candidates for re-classification; (b) assigning a numerical parameter to each candidate pixel based on a predetermined relationship between the candidate pixel and a reference pixel; (c) for each candidate pixel, comparing its parameter with a first range of values and re-classifying the pixel as a background pixel if the parameter falls within the first range; (d) for each candidate pixel, comparing its parameter with a second range of values, lying within the first range, and re-classifying the pixel as a background pixel if the parameter falls within the second range; (e) providing first and second sets of updated image data including each pixel re-classified in steps (c) and (d) respectively; (f) identifying, from the second set of updated image data, a region that includes a cluster of adjacent foreground pixels; and (g) identifying, from the first set of updated image data, foreground pixels whose respective positions are within the region identified in step (f), and thereafter classifying said plurality of foreground pixels as representing a common object.

According to a third aspect of the invention, there is provided a method of processing data representing frames of a video sequence, each frame comprising a plurality of pixels each occupying a respective frame position, the method comprising: (a) providing a first mask indicating pixel classification as either foreground or background; (b) identifying a region within the first mask containing a cluster of adjacent foreground pixels; (c) for each foreground pixel, identifying whether said pixel should be a candidate for re-classification by comparing said pixel with a reference pixel occupying the same frame position in a stored reference frame; (d) re-classifying substantially all candidate pixels as background pixels and generating therefrom a second mask indicating pixel classification following re-classification; (e) comparing the first and second masks to identify two or more foreground pixels in the second mask that fall within the region identified in (b); and (f) providing a third mask identifying the foreground pixels identified in (e) as representing a common object.

According to a fourth aspect of the invention, there is provided a video processing system arranged to process data representing pixels of a video frame, the pixels having been pre-classified as belonging either to a foreground or background region, the system comprising means arranged to: (a) identify, in the video frame (i) a region that includes a plurality of adjacent foreground pixels, and (ii) one or more foreground pixels as being candidates for re-classification by means of using a predetermined algorithm (b) re-classify the candidate pixels as background pixels and generate a comparison frame including said re-classified pixels; (c) identify, from the comparison frame, foreground pixels whose respective frame position is within the region identified in step (a); and (d) classify the foreground pixels identified in step (c) as representing a common foreground object.

The video processing system may form part of a video surveillance system.

The invention will now be described, by way of example, with reference to the accompanying drawings in which.

Figure 13:
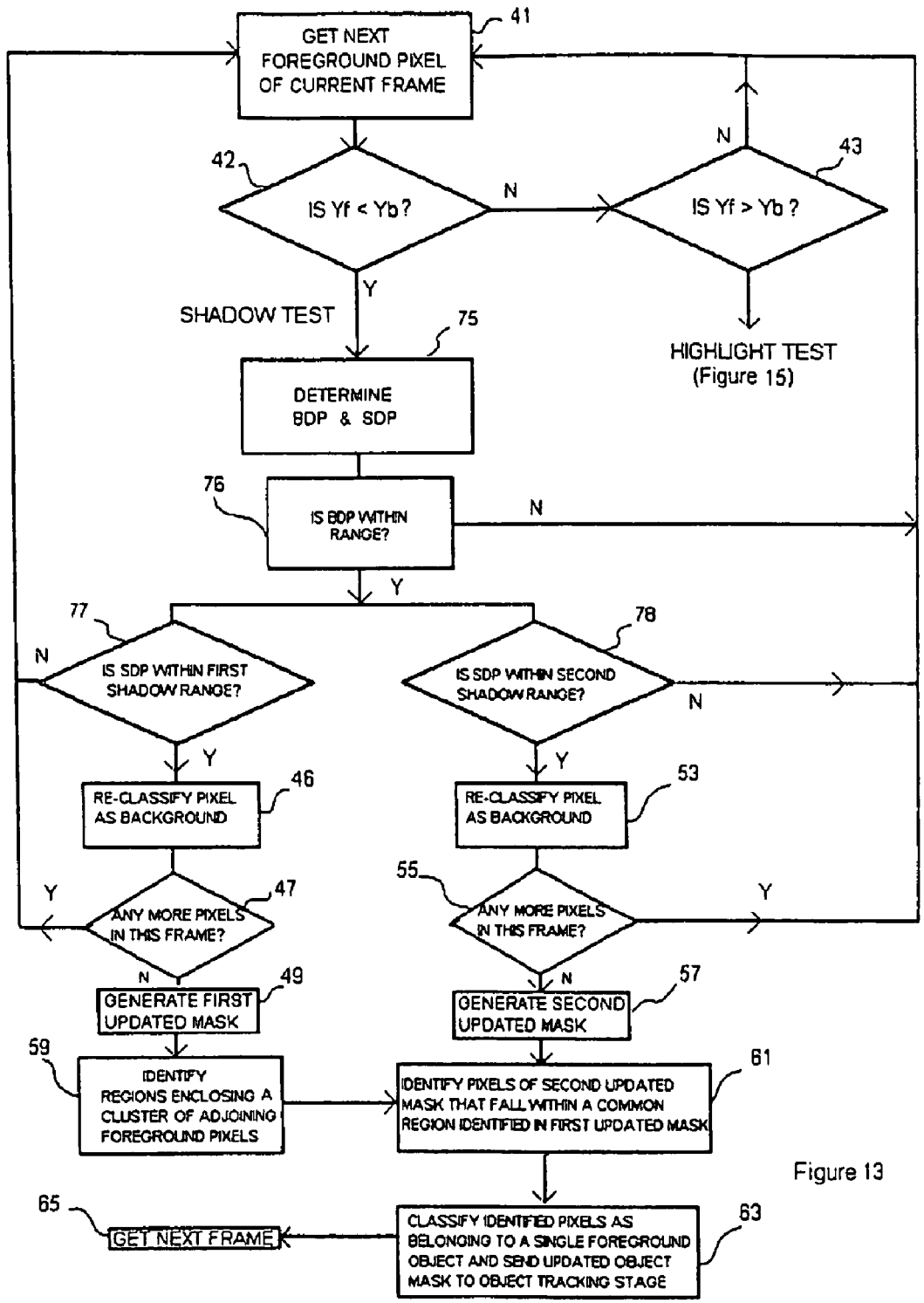
FIG. 13 is a flow chart showing steps of a shadow removal operation in a second preferred embodiment.
Figure 14:
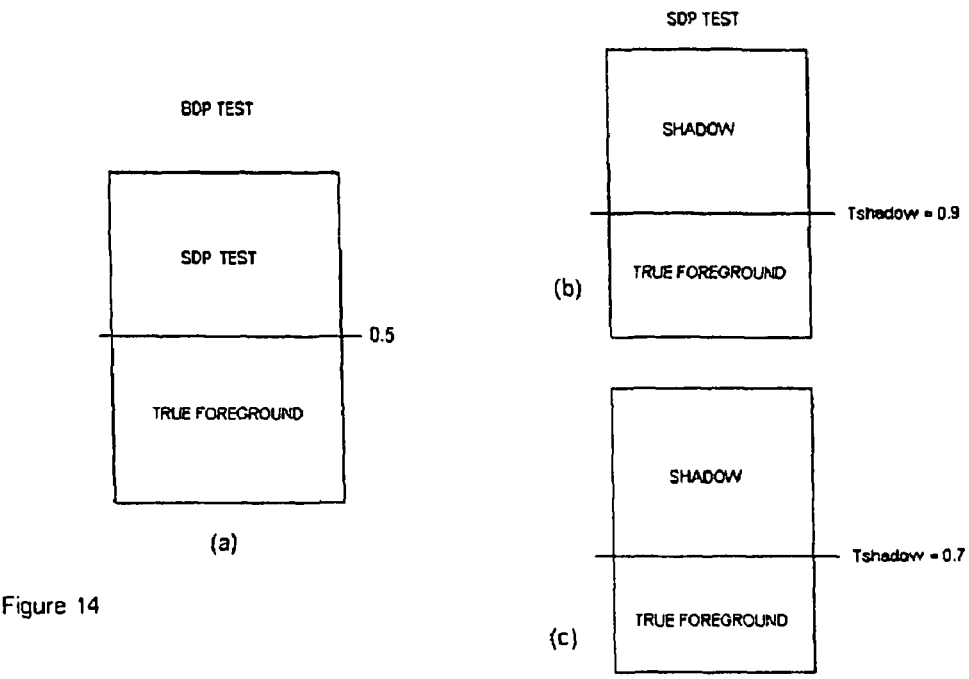
Figure 16:
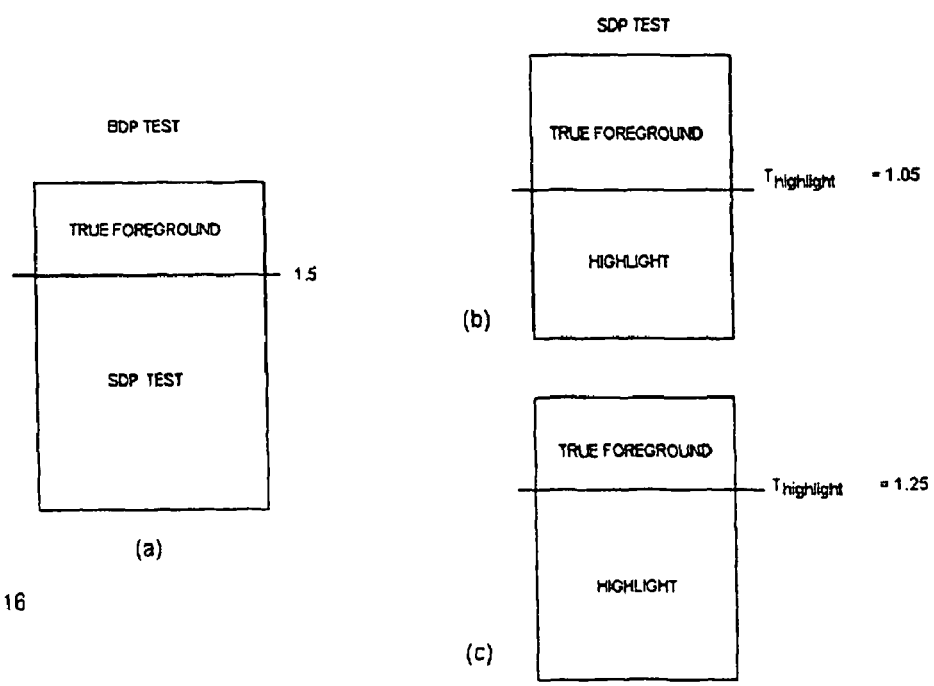
Figure 15:
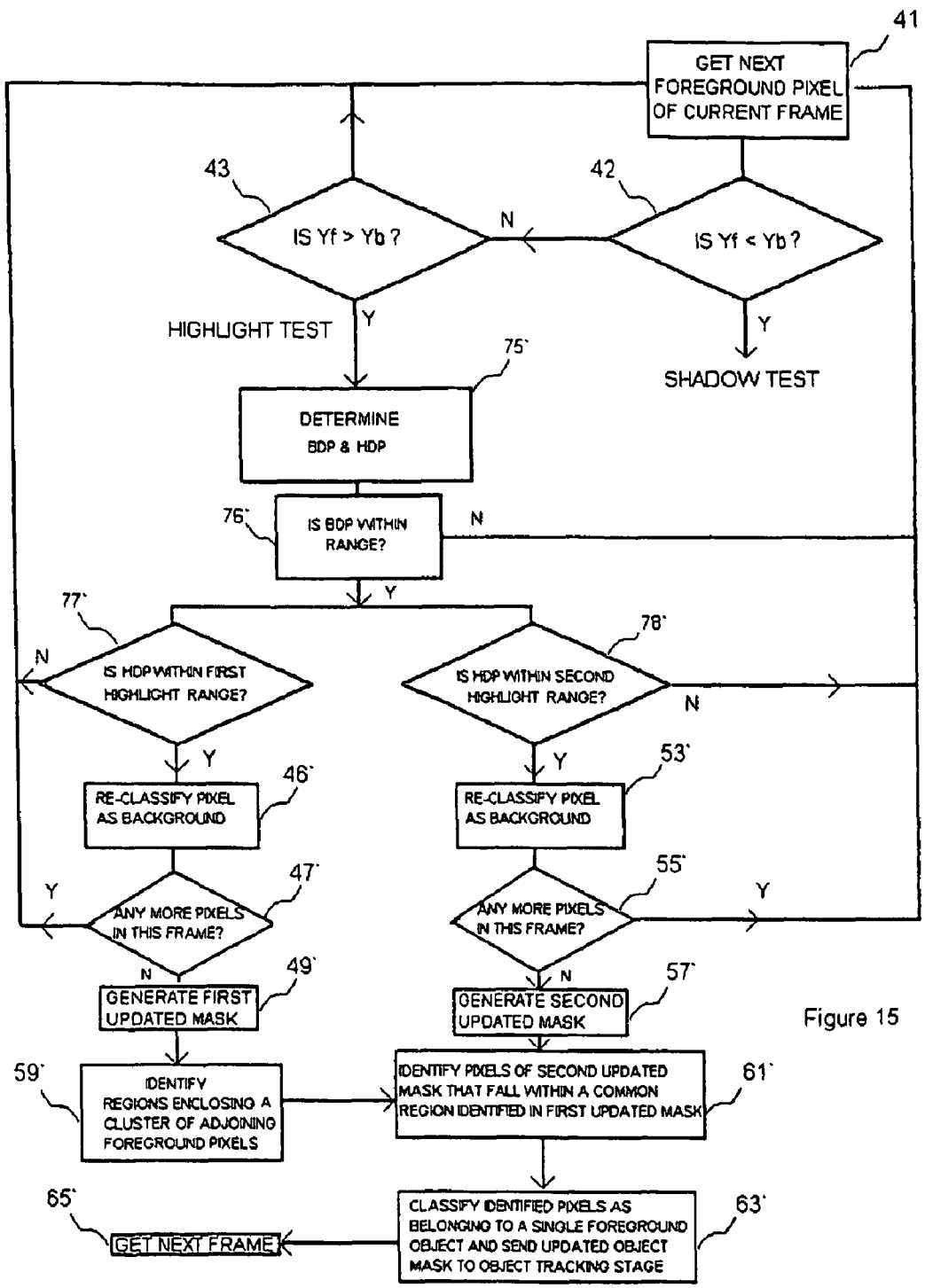
Figure 17:
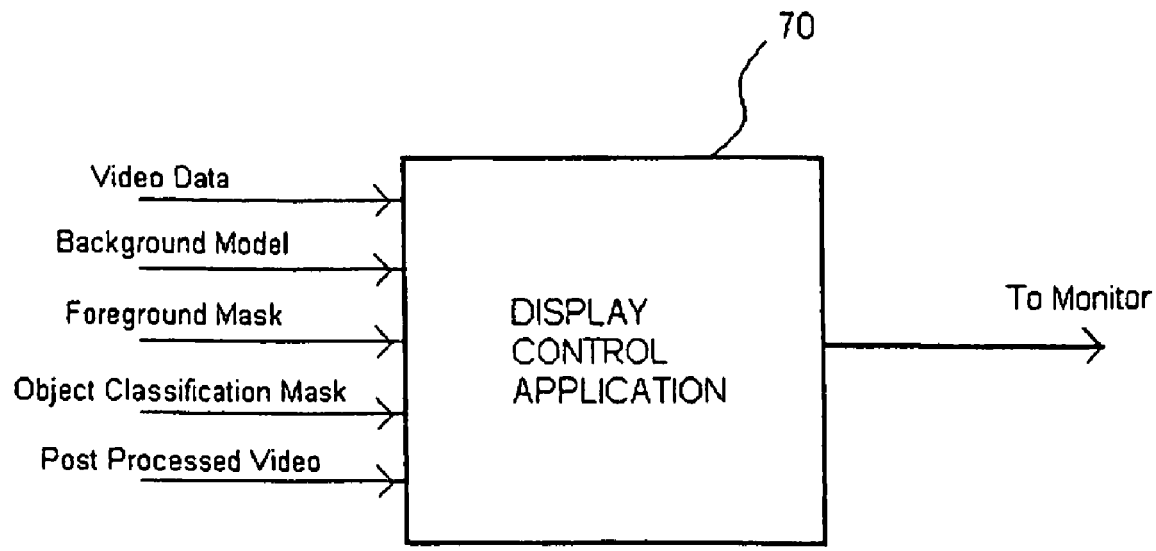
Figure 18:
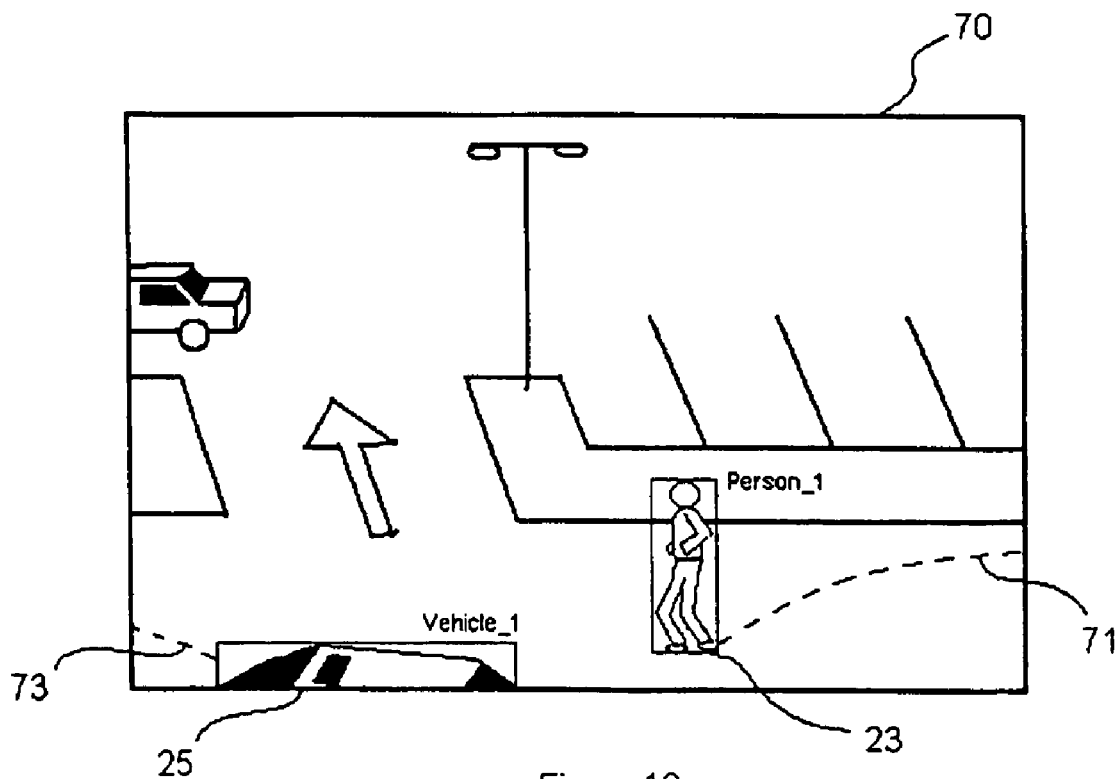

FIGS. 14a-c are diagrams representing value ranges used by different stages of the flow chart of FIG. 13;

FIG. 15 is a flow chart showing steps of a highlight removal operation in the second preferred embodiment;

FIGS. 16a-c are diagrams representing value ranges used by different stages of the flow chart of FIG. 15;

FIG. 17 is a block diagram showing a display control application forming part of the video system; and FIG. 18 is a representation of a post-processed video image.

Figure 1:
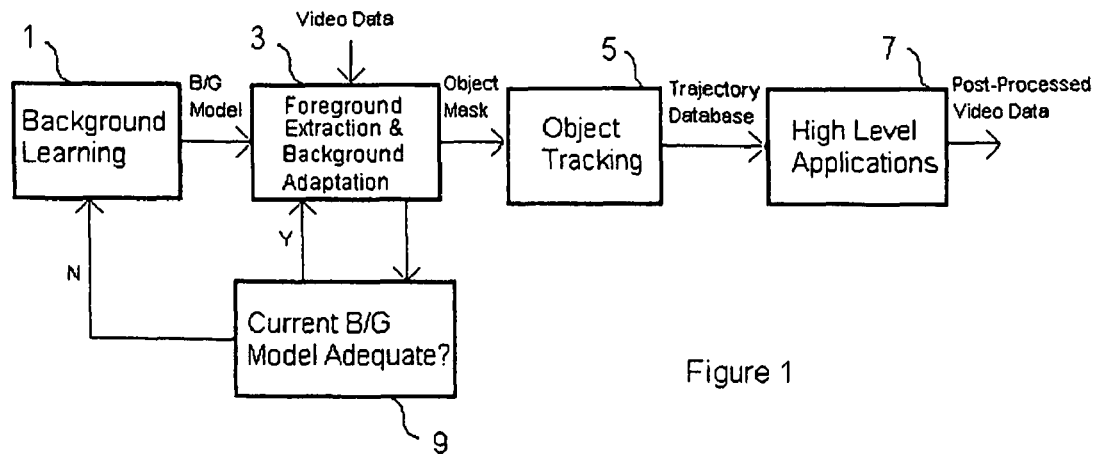
FIG. 1 is a block diagram showing processing stages in a prior art intelligent video system.
Figure 2:
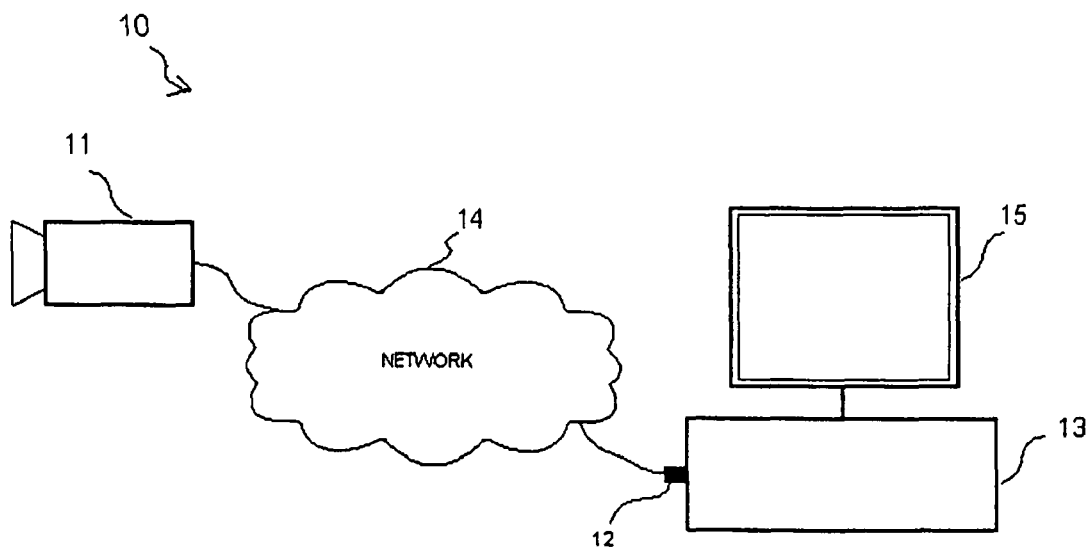
FIG. 2 is a block diagram showing components of intelligent video system according to the invention.

Referring to FIG. 2, an intelligent video surveillance system 10 comprises a camera 11, a personal computer (PC) 13, and a video monitor 15. The camera 11 is a web camera, for example a Logitec™ Pro 4000 colour webcam. Any type of camera capable of outputting digital image data can be used, for example a digital camcorder or an analogue camera with analogue-to-digital conversion means. The web camera 11 communicates with the PC 13 over a network 14, which could be any network such as a Local Area Network (LAN) or the Internet. In practice, the web camera 11 and PC 13 are connected to the network 14 via respective network connections (not shown), such as Digital Subscriber Line (DSL) modems. Alternatively, the web camera 11 could be connected directly to the PC 13 by means of the PC's universal serial bus (USB) port 12. The PC 13 may comprise any standard computer. In this case, the PC 13 is a desktop computer having a 1 GHz processor, 512 Megabytes random access memory (RAM), and a 40 Gigabyte hard disk drive. The video monitor 15 is a 17" thin film transistor (TFT) monitor connected to the PC 13 by a standard video connector.

Video processing software is provided on the hard disk drive of the PC 13. The software is arranged to perform a number of processing operations on video data received from the web camera 11. The video data represents individual frames of captured video, each frame being made up of a plurality of picture elements, or pixels. In this embodiment, each frame has a display format of 320 pixels (width) by 240 pixels (height). Alternative display formats may be used depending on the application. Since the web camera 11 is a colour camera, each pixel is represented by data indicating the pixel's position in the frame, as well as the respective weightings of the three colour components, namely red, green and blue components, which determine the displayed colour. As will be understood in the art, the luminance Y of a given pixel may be approximated by the following expression:

$$Y = \alpha.R + \beta.G + \gamma.B \quad (1)$$

where $\alpha=0.114$, $\beta=0.587$, and $\gamma=0.299$.

R, G and B respectively represent the values of the red, green and blue colour components. Although alternative expressions for Y are known, the applicant has found the above expression to be preferable.

Figure 3:
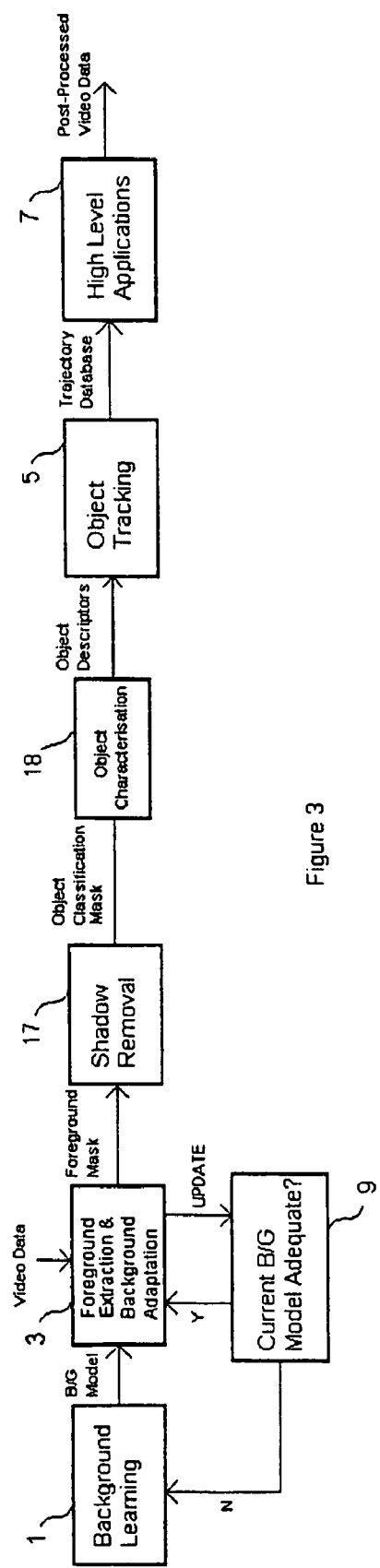
FIG. 3 is a block diagram showing processing stages of the intelligent video system.

The video processing software comprises a number of different stages, as shown in FIG. 3. FIG. 3 is similar to FIG. 2 with the addition of a shadow removal stage 17 and an object characterisation stage 18, both stages being incorporated between the foreground extraction stage 3 and the object tracking stage 5.

The purpose of the shadow removal stage 17 is to remove a substantial proportion of shadow and highlight regions from each video frame. In this way, subsequent processing stages, which identify the shape of foreground regions, are able to operate with improved reliability.

The purpose of the object characterisation stage 18 is to identify foreground features following foreground extraction and shadow removal. The output comprises a set of object descriptors that are used by the object tracking stage 5. A detailed understanding of this stage 18 is not essential for understanding the invention.

Initially, the video processing software runs a background learning stage 1. As mentioned in the introduction, the purpose of this stage is to establish a background model from an initial segment of video data. This video segment will typically comprise two hundred frames. Since the background scene of any image is likely to remain relatively stationary (compared with foreground objects) this stage establishes a background model in which no foreground objects would be visible.

Figure 4:
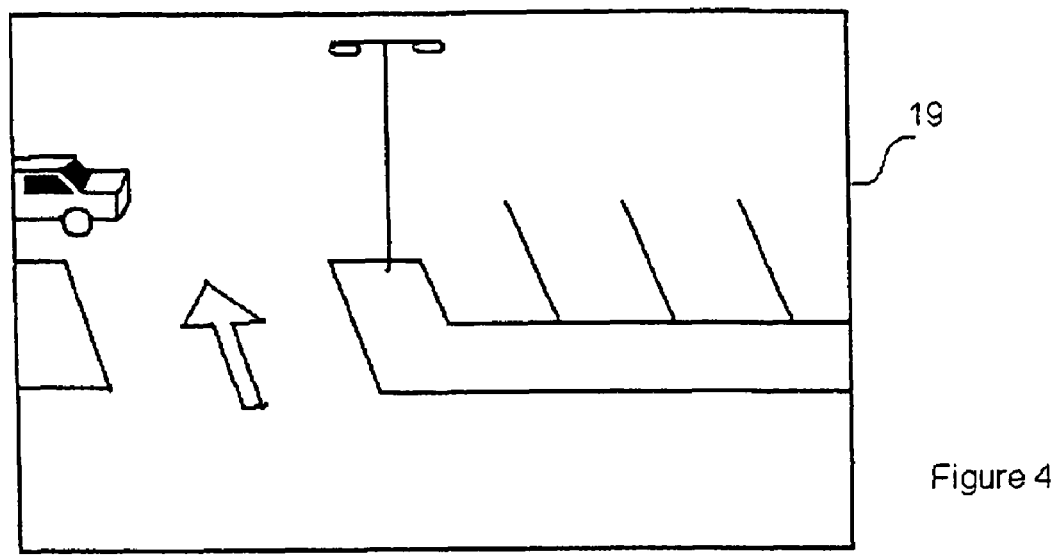
FIG. 4 is a representation of an image of a background model used by a foreground extraction stage of the video system.

FIG. 4 shows a background model 19 established during the above-mentioned background learning stage 1. In this case, the web camera 11 was oriented towards a car park. In the memory of the PC 13, the background model 19 is represented by a set of stored data representing the pixel's position, and the respective weightings of the red, green and blue colour components of each pixel.

Having established the background model 19, incoming video frames are received by the PC 13 and are processed by the video processing software. The subsequent foreground extraction stage 3, shadow removal stage 17, object characterisation stage 18, object tracking stage 5, and the high level applications 7 process the video frames in real time.

The foreground extraction and background adaptation stage 3 (hereafter referred to as 'the foreground extraction stage') processes each pixel of the current frame. Each pixel is compared with the pixel occupying the corresponding position in the background model 19 to estimate whether the pixel of the current frame represents part of a foreground object or background. Small changes in the background model 19 are updated adaptively. More severe or sudden changes in the background model 19 require a relearning operation, which is performed using the test indicated by reference numeral 9.

Although a detailed explanation of the foreground extraction stage 3 is not essential for understanding the invention, the skilled person will appreciate that there are known methods for performing foreground extraction 3. Perhaps the simplest is to compare the luminance of each pixel with that of the pixel occupying the corresponding position in the background model 19. If the difference between the two is above a predetermined threshold, the current pixel is classified as a foreground pixel.

A particularly effective method is the so-called Mixture of Gaussian (MoG) method which is described in detail by Stauffer & Grimson in 'Learning Patterns of Activity Using Real-Time Tracking', IEEE Transactions on Pattern Analysis and Machine Intelligence, Volume 22, No. 8, August 2000, pp. 747-757. An implementation of the MoG method is also described in US Patent Application Publication No. 2003/0053658. Both references describe a background learning method that is suitable for establishing the above-mentioned background model 19.

In summary, the MoG method involves modelling each pixel of an incoming video frame as a mixture of different Gaussian (or normal) statistical distributions. This reflects the assumption that samples of the same scene point are likely to display Gaussian noise distributions. The mixture of normal distributions reflects the expectation that more than one process may be observed over time. Based on the persistence and variance of each of distribution of the mixture, it is determined which distributions may correspond to the current background. Distributions that do not fit the background distributions are classified as foreground pixels until there is a distribution that does correspond and which is supported by consistent evidence built up over a number of frames.

In the case of the embodiments described herein, the foreground extraction stage 3 preferably operates using the MoG method. However, this is by no means essential and any alternative method can be used.

Figure 5:
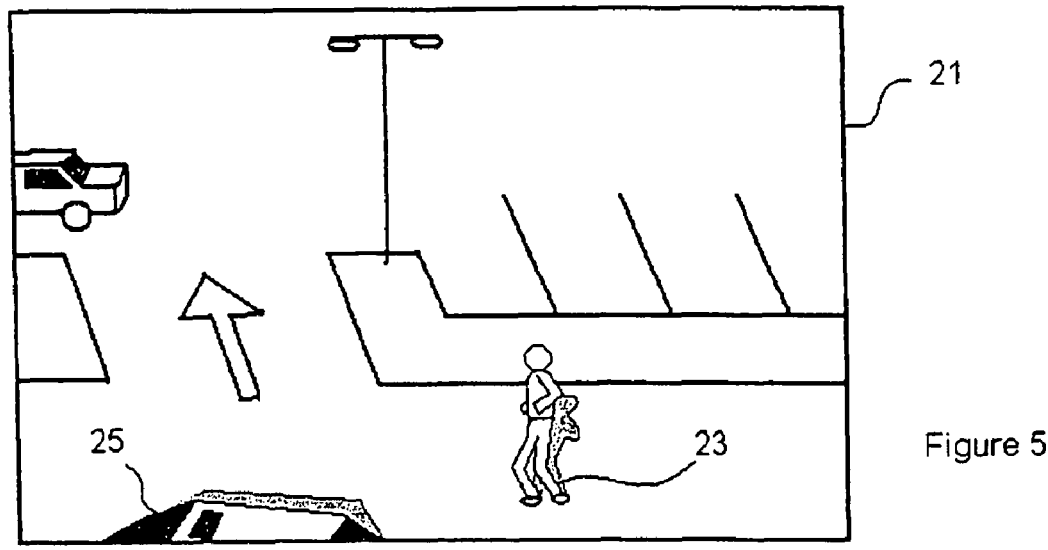
FIG. 5 is a representation of an incoming video frame to the foreground extraction stage.
Figure 6:
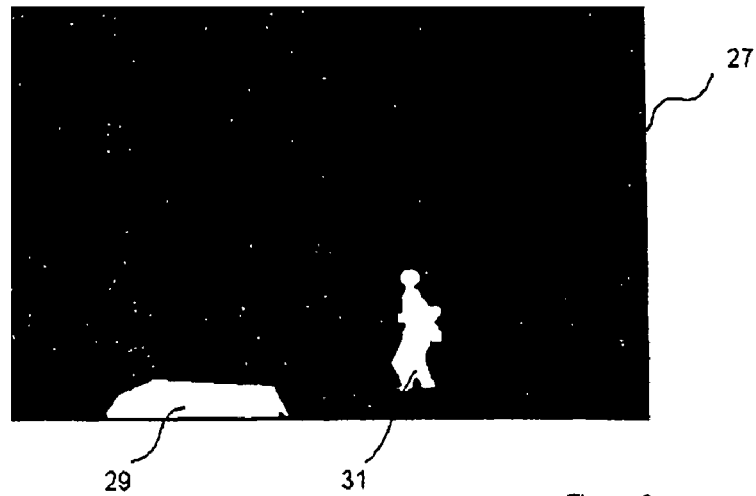
FIG. 6 is a representation of a foreground mask image that is generated by the foreground extraction stage.

The operation of the foreground extraction stage 3 will be better understood by referring to FIG. 5 which shows an incoming video frame 21 from the web camera 11. The video frame 21 depicts (a) a person 23 walking across the car park, and (b) a vehicle 25 crossing the lower part of the car park. Each pixel of the video frame 21 is compared with the corresponding pixel in the background model 19 to determine whether that pixel should be classified as a foreground pixel or a background pixel. As a result, the foreground extraction stage 3 generates a foreground mask. A mask is a set of image data that includes information concerning the classification of each pixel, i.e. whether it represents foreground or background. Referring to FIG. 6, a visual representation of the foreground mask 27 is shown in which foreground pixels are shown in white and background pixels are shown in black.

The foreground mask 27 includes first and second foreground regions 29, 31. However, neither foreground region 29, 31 is particularly well defined in terms of its shape and, using the foreground mask 27 alone, it is difficult to determine which foreground objects are actually represented. This is due to the presence of shadows which, as shown in FIG. 5, are cast by the person 23 and vehicle 25 onto the background. Pixels representing the shadows have a darker intensity than pixels occupying the corresponding position in the background model 19. Accordingly, these pixels have been wrongly classified as foreground pixels. The presence of highlights, where a pixel has a lighter intensity than that of its corresponding background pixel, can cause a similar problem.

As a consequence of shadows and highlights, problems are likely to occur in subsequent processing stages. If, for example, the object characterisation stage 18 receives the foreground mask 27 direct from the foreground extraction stage 3, it may have difficulty identifying features of a foreground object. This is likely to cause further problems in later processing stages. The object tracking stage 5 may have difficulty making a correspondence between foreground objects in the current frame and those tracked in previous frames. A similar problem may occur if the video surveillance system 10 includes an object classification stage in which objects are classified according to which 'real-world' object their respective mask profile resembles.

In order to mitigate the above-mentioned problems, the video processing software includes a shadow removal stage 17.

Figure 7:
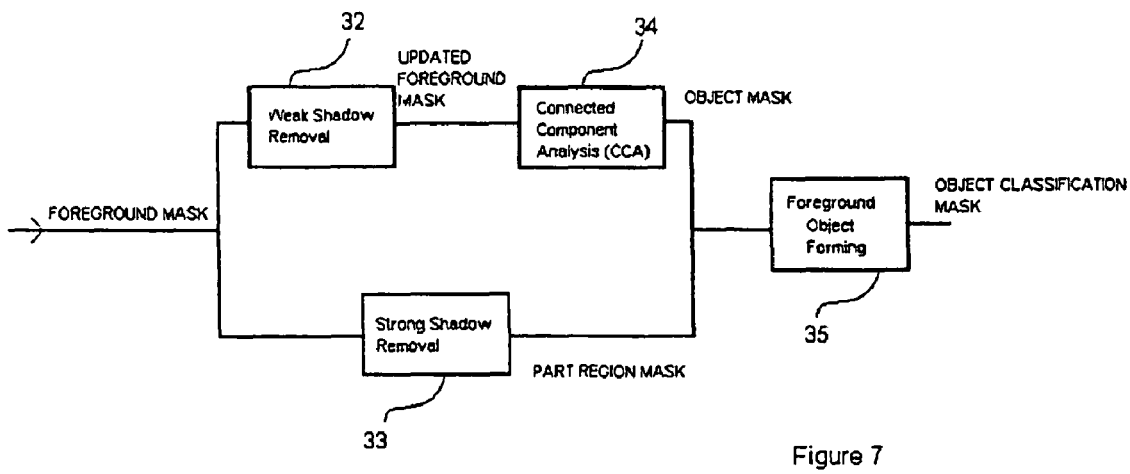
FIG. 7 is a block diagram showing functional elements of a shadow removal stage of the video system.

FIG. 7 shows the main functional elements of the shadow removal stage 17. A two-branch process is employed, comprising weak shadow removal 32 and strong shadow removal 33. Both operate in parallel on the foreground mask 27, and generate therefrom, respectively, an update mask and a part region mask.

It should be understood that parallel operation is not essential to the invention. However, for the purposes of this real-time video surveillance system 10, parallel operation is preferred.

The purpose of weak shadow removal 32 is to remove only the most severe shadows present in the current frame. In effect, it is assumed that there are only a few highly distinguishable shadows present. On its own, however, weak shadow removal 32 will be insufficient since the frame is, in reality, likely to have a number of shadows of varying intensity. As a result, it is likely that a number of pixels will still be wrongly classified as foreground pixels.

Conversely, the purpose of strong shadow removal 33 is to remove substantially every shadow present in the current frame. As a result, it is likely that some true foreground areas will be incorrectly detected as shadow regions. Objects that cast shadows onto themselves, so-called self-shadows, are particularly vulnerable. For example, a frame showing a human face may include a self-shadow region cast by the nose onto the cheek. Strong shadow removal 33 will cause this region to be removed despite the pixels of this region actually forming part of the foreground object, i.e. the face. The result is usually a fragmented image in which parts of the same object appear detached from one another. Subsequent processing steps may interpret each fragment as a separate object.

The shadow removal stage 17 uses the output from both weak and strong shadow removal 29, 30 to generate a so-called object classification mask. The object classification mask effectively comprises the part region mask, which provides an improved representation of foreground object shapes, with additional classification information to ensure that, where appropriate, fragmented objects parts are identified as belonging to a common object. To achieve this, a connected component analysis (CCA) operation 34 is employed on the update mask following weak shadow removal 32. The CCA operation generates an object mask that is sent to a foreground object forming stage 35. The operation of the CCA stage 34 and the foreground object forming stage 35 will be described below.

The purpose of the CCA operation 34 is to identify one or more clusters of image pixels in the updated foreground mask. A cluster may comprise two or more adjacent, or adjoining, pixels. Following this, a boundary defining the smallest rectangular area enclosing each cluster is automatically established by the software. The position of each rectangular area on the frame is added to the first update mask to form the object mask.

Figure 8A:
FIGS. 8a-8h show representations of a mask image generated at different phases of the shadow removal stage.
Figure 8B:

To illustrate the above process, we assume the foreground mask 27 shown in FIG. 6 to be the current input to the shadow removal stage 17. FIG. 8*a* shows the updated foreground mask 36 resulting from weak shadow removal 32. As anticipated, although some shadows have been removed, the shape of each object 29', 31' remains poorly defined. FIG. 8*b* shows the object mask 37 generated by the CCA stage 34 in which rectangular boundaries have been added enclosing the respective clusters 29' and 31'.

Figure 8C:

FIG. 8*c* shows the part region mask 38 following strong shadow removal 33. It will be noted that the shape of each object 29", 31" is better defined. However, strong shadow removal 33 has inevitably resulted in some foreground pixels being incorrectly classified as background pixels and each object has been fragmented into a number of separate parts.

In the foreground object forming stage 35, the object mask 37 and the part region mask 38 are compared to identify foreground pixels in the part region mask 38 whose position falls within a common rectangular area of the object mask 37. All foreground pixels that fall within a common rectangular area are classified as belonging to the same foreground object.

Figure 8D:
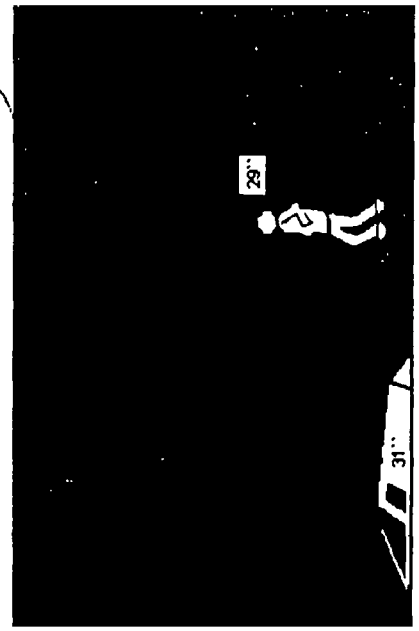

As mentioned above, the output generated by the foreground object forming stage 35 is referred to as the object classification mask 39. The object classification mask 39 provides an improved shape representation of foreground objects using strong shadow removal 33. Potential problems, due to the fragmentation of foreground regions, are avoided by assigning a common identity to each part falling within a given boundary region, the size of which is determined by weak shadow removal 32. FIG. 8*d* shows a visual representation of an object classification mask 39 resulting from the foreground object forming stage 35.

Figure 8E:
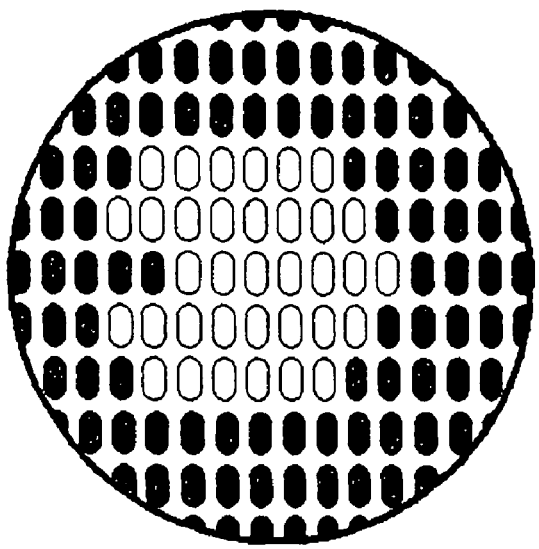
Figure 8F:
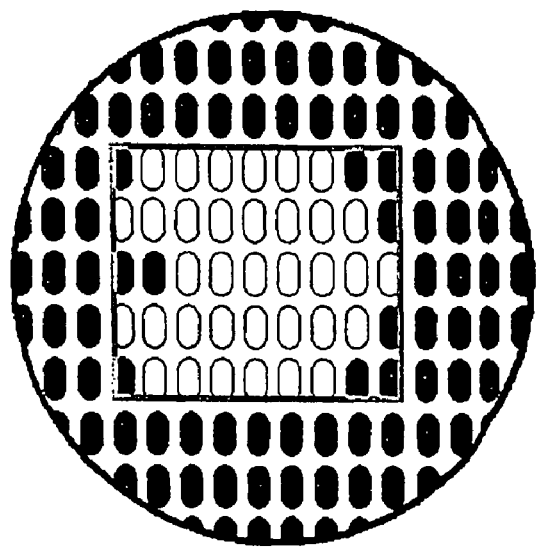
Figure 8G:
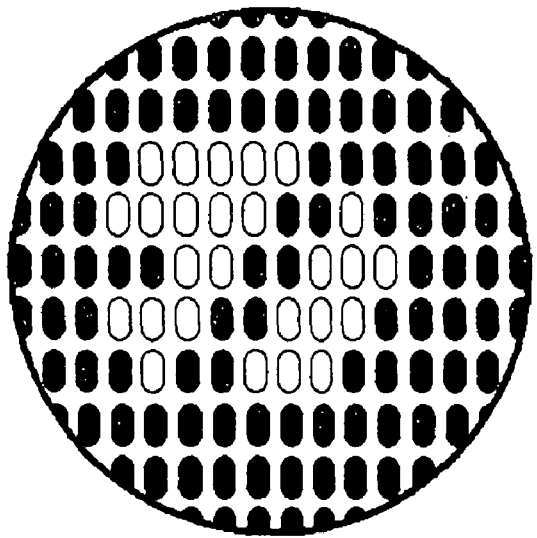
Figure 8H:
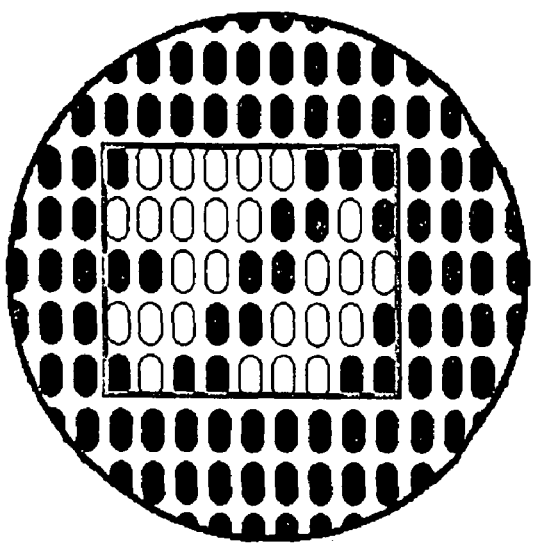

The operating principle of the CCA stage 34 and the object forming stage 35 is better understood by referring to FIGS. 8e to 8h. FIG. 8e shows a close-up portion of a foreground mask following weak shadow removal 32. A single cluster of foreground pixels is present. FIG. 8f shows a close-up portion of an object mask generated by the CCA stage 34. The CCA stage 34 has defined a rectangular boundary just large enough to enclose each foreground pixel. FIG. 8g shows a close-up portion of a part region mask following strong shadow removal 33. Rather than a single cluster of foreground pixels being present, there are two separate clusters. FIG. 8h shows a close-up portion of an object classification mask following the foreground object forming stage 35. All foreground pixels in the part region mask which fall within the rectangular boundary defined by the CCA stage 34 have been classified as representing a common foreground region.

For completeness, a detailed description of the software-level operation of the shadow removal stage 17 will now be described. Two embodiments are described, the first embodiment being described below with reference to FIGS. 9 to 12. A second embodiment will be described further on with reference to FIGS. 13 to 16.

Figure 9:
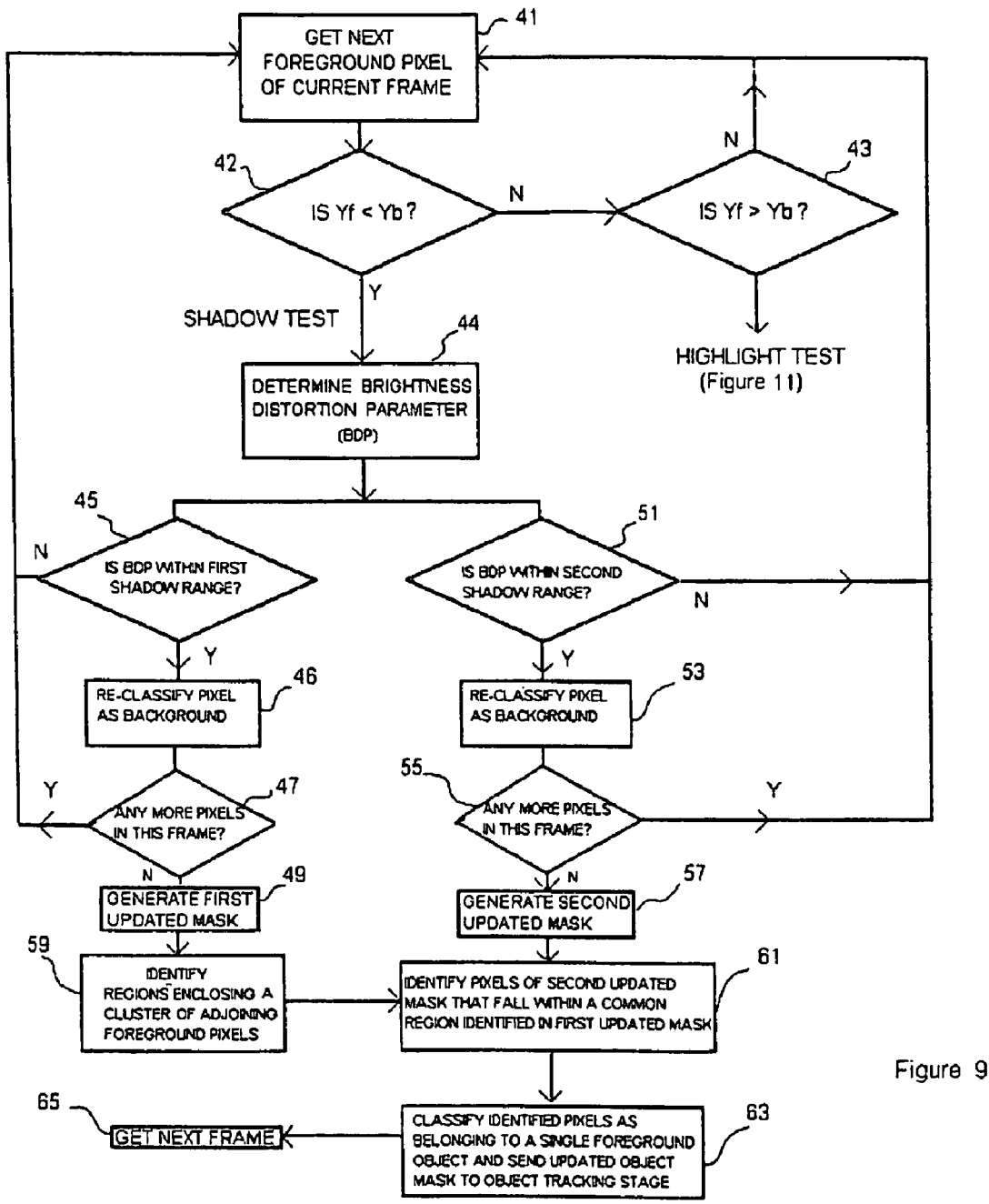
FIG. 9 is a flow chart showing each step in a shadow removal operation performed by the shadow removal stage.

Referring to FIG. 9, in the first embodiment, the first step 41 is to get the next foreground pixel in the current frame. In the following step 42, the luminance of the pixel $(Y_f)$ is compared with the luminance $(Y_b)$ of the pixel occupying the same position in the stored background model. If $Y_f < Y_b$, meaning the pixel has a darker intensity than the background pixel, a test is performed to determine whether the pixel occupies a shadow region. If it does not, a further test is performed in step 43 to determine whether $Y_f > Y_b$, in which case a test is performed to determine whether the pixel occupies a highlight region. This will be described later in the description.

If $Y_f < Y_b$, the pixel may be considered a candidate for re-classification. The next step 44 is to calculate a so-called brightness distortion parameter (BDP) for the candidate pixel. A simple expression for calculating the BDP is given by:

$$BDP = \frac{R_f R_b + G_f G_b + B_f B_b}{R_b^2 + G_b^2 + B_b^2} \quad (2)$$

where $R_f$, $G_f$, $B_f$ represent, respectively, the red, green and blue colour components of the candidate pixel, and $R_b$, $G_b$, $B_b$ represent, respectively, red, green and blue colour components of the corresponding pixel in the background model.

A more complex expression for calculating the BDP is detailed below in relation to the second embodiment. However, this alternative expression can be used with the first embodiment.

Having calculated the BDP for the candidate pixel, two separate sets of steps are performed which correspond to the weak and strong shadow removal operations 32, 33 described previously. These will be described below.

Figure 10A:
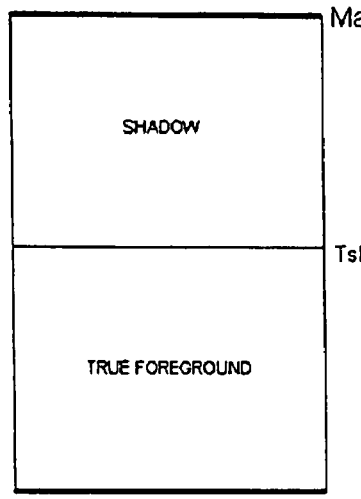
FIGS. 10a-10b are diagrams representing value ranges used by different steps of the flow chart of FIG. 9.

In step 45, the BDP of the candidate pixel is compared with a first range of BDP values, as represented in FIG. 10a. The range is divided into two parts by a threshold value '$T_{shadow}$'. In the general case, $T_{shadow}$ will be a value of between 0 and 1. In this embodiment, a value of 0.9 is chosen. If the BDP is equal to, or below, the value of $T_{shadow}$, then the candidate pixel is considered correctly classified as a foreground pixel. If, however, the BDP is above the value of $T_{shadow}$ the candidate pixel is considered to represent part of a shadow region and so, in step 47, the candidate pixel is re-classified as a background pixel.

Figure 10B:
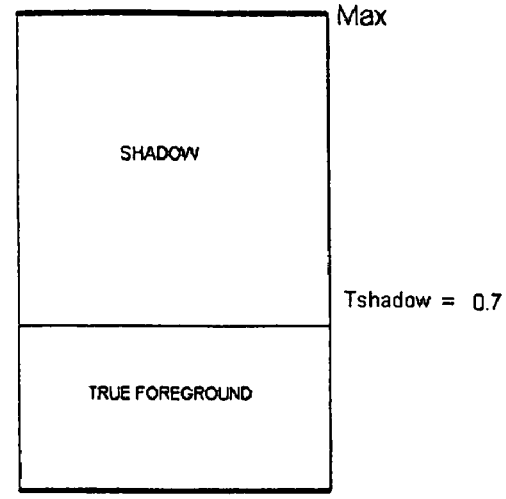

In step 51, the BDP of the candidate pixel is compared with a second range of BDP values, as represented in FIG. 10b. In this case, the value of $T_{shadow}$ is set to a lower value of 0.7. As before, if the value of BDP is above the value of $T_{shadow}$, the candidate pixel is taken to represent part of a shadow region and so, in step 53, is re-classified as a background pixel.

Given that the 'shadow' region of the second range covers a larger range of values than the first, it follows that steps 45 and 46 correspond to weak shadow removal 32 and steps 51 and 53 correspond to strong shadow removal 33.

Following performance of the above described steps, it is determined whether there are any remaining candidate pixels in the current frame (steps 47, 55). If all candidate pixels have been checked, updated masks are generated that include the re-classified pixels from the previous steps. In step 49, the updated foreground mask is generated indicating pixel classification following weak shadow operation and, in step 57, the part region mask is generated indicating pixel classification following strong shadow removal.

In step 59, one or more regions enclosing a cluster of adjacent foreground pixels are identified from the updated foreground mask. Step 59 corresponds to the CCA operation and, as mentioned above, generates the object mask. In the following step 61, the part region mask and the object mask are compared in order to identify groups of pixels in the part region mask whose respective positions fall within a common region identified in the object mask. In step 63, foreground pixels falling within a common region are classified as representing a single foreground object. The resulting object classification mask is forwarded to the object tracking stage 5. The next frame is requested in step 65 and the process repeats from step 41.

Figure 12A:
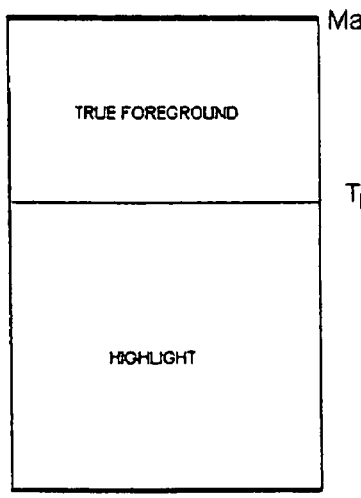
FIGS. 12a-12b are diagrams representing value ranges used by different steps of the flow chart of FIG. 11.
Figure 12B:
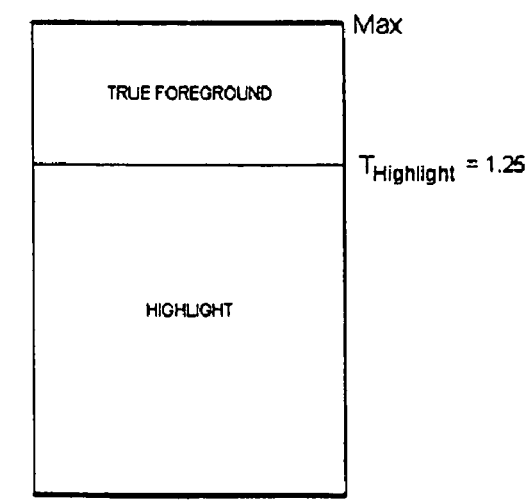
Figure 11:
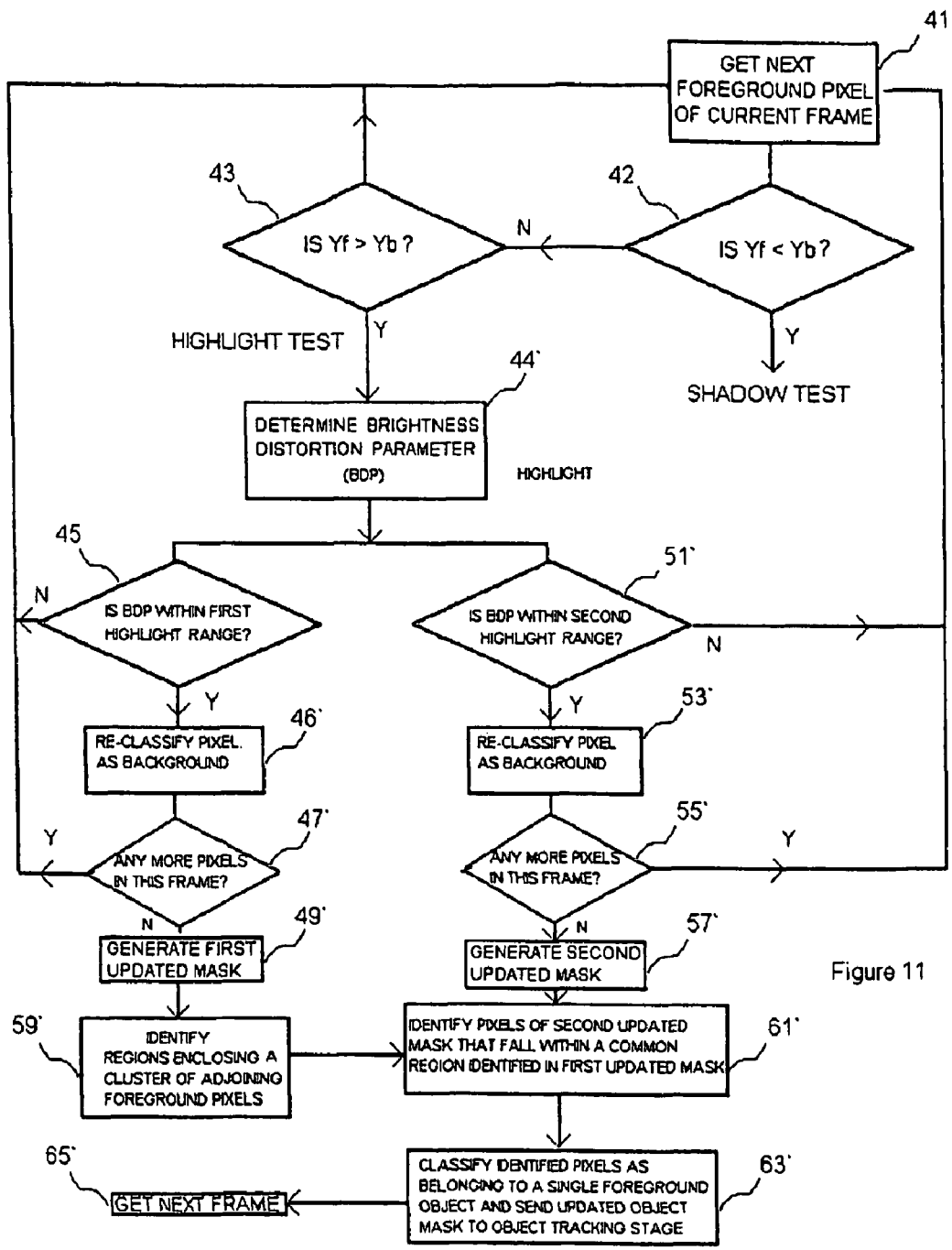
FIG. 11 is a flow chart showing each step in a highlight removal operation performed by the shadow removal stage.

As indicated in FIG. 10, if the test performed in step 42 is negative, a further test is performed in step 43 to determine if $Y_f > Y_b$. If the result is positive, meaning that the intensity of the pixel is greater than the background pixel, a further test is performed to determine whether the pixel occupies part of a highlight region. The stages involved in this test are shown in the flow chart of FIG. 11. It will be seen that the stages are essentially identical to those shown in FIG. 9 and so a detailed explanation of each step will not be covered. However, it is worth noting that the BDP mentioned in step 44' is calculated using the same expression as for step 44, for which see FIG. 9. Steps 45' and 51' respectively correspond to the weak and strong shadow removal steps 45 and 51. FIGS. 12a and 12b show the respective first and second highlight ranges used in steps 45' and 51'. In this case, each range is divided by a threshold value '$T_{highlight}$' which will be a value above 1. In this embodiment, a value of 1.05 is chosen for the first highlight range, and a value of 1.25 is chosen for the second highlight range. The candidate pixel will be re-classified as a background pixel if, in either case, its BDP is below the value of $T_{highlight}$, i.e. between 0 and $T_{highlight}$.

The above-mentioned values chosen for $T_{shadow}$ and $T_{highlight}$ have been found, through experimentation, to be very effective in most surveillance situations, regardless of gradual changes in lighting and/or weather conditions. These values remain fixed whilst the video surveillance system 10 is operating, thus keeping the PC's processing burden to a minimum. This is clearly advantageous in a real-time system. Should a slight adjustment be desirable, manual adjustment is facilitated by the image processing software.

A second embodiment of the shadow removal stage 17 will now be described with reference to FIG. 13 to 16 of the accompanying drawings.

Referring to FIG. 13, it will be appreciated that most of the steps shown are identical to those shown in FIG. 9. Accordingly, like reference numerals are used for like elements, and a detailed description of these particular steps is not required. The main differences are in the shadow test procedure following step 42.

In step 42, if $Y_f < Y_b$, the next step 75 is to calculate two different parameters for the candidate pixel. The first is the BDP and the second is a so-called 'Shadow Distortion Parameter' (SDP). The BDP and SDP are used in two respective tests in order to determine whether a foreground pixel is correctly or incorrectly classified.

The BDP used in this embodiment is an alternative version to that of expression (2) and is given by:

$$BDP = \frac{\alpha^2 \cdot R_f \cdot R_b + \beta^2 \cdot G_f \cdot G_b + \gamma^2 \cdot B_f \cdot B_b}{\alpha^2 \cdot R_b^2 + \beta^2 \cdot G_b^2 + \gamma^2 \cdot B_b^2} \quad (3)$$

where the values of $\alpha$, $\beta$ and $\gamma$ are the same values given in (1). Expression (3) has been found to yield more satisfactory results since it takes into account the above-mentioned coefficients which are used to calculate the luminance value Y.

Either expression (1) or (3) can be used to generate BDP and its use is not limited to one particular embodiment.

The SDP is a numerical value given by the equation:

$$SDP = \text{MAX} \begin{pmatrix} \frac{\alpha^2 \cdot R_f \cdot R_b + \beta^2 \cdot G_f \cdot G_b}{\alpha^2 \cdot R_b^2 + \beta^2 \cdot G_b^2}, \\ \frac{\beta^2 \cdot G_f \cdot G_b + \gamma^2 \cdot B_f \cdot B_b}{\beta^2 \cdot G_b^2 + \gamma^2 \cdot B_b^2}, \\ \frac{\alpha^2 \cdot R_f \cdot R_b + \gamma^2 \cdot B_f \cdot B_b}{\alpha^2 \cdot R_b^2 + \gamma^2 \cdot B_b^2} \end{pmatrix} \quad (4)$$

Thus, three expressions are calculated and the value of the highest one is returned as the SDP.

Having calculated the BDP and SDP for the candidate pixel, in step 76 a comparison operation is performed to determine whether the BDP is within a predetermined range. In this case, the range is between 0.5 and the maximum BDP value. If the BDP is not within range, i.e. below 0.5, then the pixel is considered correctly classified and the next foreground pixel is obtained in step 41. If the BDP is within range, two separate sets of steps are performed which correspond to the weak and strong shadow removal operations 32, 33 described previously. FIG. 14a indicates the range of BDP values used in step 76.

In step 77, the SDP of the candidate pixel is compared with a first range of SDP values, as represented in FIG. 14b. As with the first embodiment, the range is divided into two parts by a threshold value '$T_{shadow}$'. In the general case, $T_{shadow}$ will be a value of between 0 and 1. In this embodiment, a value of 0.9 is chosen. If the SDP is equal to, or below, the value of $T_{shadow}$, then the candidate pixel is considered correctly classified as a foreground pixel. If, however, the SDP is above the value of $T_{shadow}$ the candidate pixel is considered to represent part of a shadow region and so, in step 46, the candidate pixel is re-classified as a background pixel.

In step 78, the SDP of the candidate pixel is compared with a second range of SDP values, as represented in FIG. 14c. In this case, the value of $T_{shadow}$ is set to a lower value of 0.7. As before, if the value of SDP is above the value of $T_{shadow}$, the candidate pixel is taken to represent part of a shadow region and so, in step 53, is re-classified as a background pixel.

Given that the 'shadow' region of the second range covers a larger range of values than the first range, it follows that steps 77 and 46 correspond to weak shadow removal 32 and steps 78 and 53 correspond to strong shadow removal 33.

The remaining steps are identical to those described previously with reference to FIG. 9.

As indicated in FIG. 13, if the test performed in step 42 is negative, a further test is performed in step 43 to determine if $Y_f > Y_b$. If the result is positive, meaning that the intensity of the pixel is greater than the background pixel, a further test is performed to determine whether the candidate pixel occupies part of a highlight region. The stages involved in this test are shown in the flow chart of FIG. 15.

It will be seen that FIG. 15 is largely identical to FIG. 13 and so a detailed explanation of each step will not be covered. The BDP mentioned in step 75' is calculated using expression (3). In step 76' it is determined whether the BDP is within a predetermined range, in this case between 1.5 and zero. FIG. 16a illustrates this range of BDP values. If the BDP is not within range, the pixel is considered correctly classified as a foreground pixel and the process repeats from step 41. If the BDP is within range, weak and strong shadow removal is performed in the subsequent steps, starting with steps 77', 78'.

Instead of using the SDP parameter, a so-called 'Highlight Distortion Parameter' (HDP) is used in the highlight test. The HDP is calculated using the expression:

$$HDP = \text{MIN} \begin{pmatrix} \frac{\alpha^2 \cdot R_f \cdot R_b + \beta^2 \cdot G_f \cdot G_b}{\alpha^2 \cdot R_b^2 + \beta^2 \cdot G_b^2}, \\ \frac{\beta^2 \cdot G_f \cdot G_b + \gamma^2 \cdot B_f \cdot B_b}{\beta^2 \cdot G_b^2 + \gamma^2 \cdot B_b^2}, \\ \frac{\alpha^2 \cdot R_f \cdot R_b + \gamma^2 \cdot B_f \cdot B_b}{\alpha^2 \cdot R_b^2 + \gamma^2 \cdot B_b^2} \end{pmatrix} \quad (5)$$

Three expressions are calculated and the value of the lowest one is returned as the HDP.

Steps 77' and 78' respectively correspond to the weak and strong shadow removal steps 77 and 78. FIGS. 16b and 16b show the respective first and second highlight ranges used in steps 77' and 78'. In this case, each range is divided by a threshold value '$T_{highlight}$' which will be a value above 1. In this embodiment, a value of 1.05 is chosen for the first highlight range, and a value of 1.25 is chosen for the second highlight range. The candidate pixel will be re-classified as a background pixel if, in either case, its BDP is below the value of $T_{highlight}$, i.e. between 0 and $T_{highlight}$.

Thus, in the second embodiment, each test, be it the shadow or highlight test, uses two different sets of parameters. The initial test uses a BDP threshold which is arranged such that a larger number of BDP values pass to the subsequent test. In the shadow removal step 76, for example, the BDP threshold is relatively low (0.5) In steps 77 and 78, each additional test uses the SDP expression against a narrower range of values to determine whether the pixel does, in fact, require re-classification. It will be noted that expression (4) takes the highest value resulting from three sub-expressions. Each sub-expression involves only two of the three colour components and takes into account the possibility that one colour component may give a false or spurious value. Similar comments apply in relation to the highlight removal step 76' which uses a relatively high BDP threshold (1.5). In steps 77' and 78', each additional test uses the HDP value against a narrower range of values. Expression (5) takes the lowest value resulting from three sub-expressions, each sub-expression involving only two of the three colour components.

Although the expressions used in the second embodiment appear more complex than those used in the first, we can simplify the calculations in the following manner. In relation to the luminance value (Y) we can re-write expression (1) as:

$$Y = 114.R + 587.G + 299.B \quad (6)$$

By multiplying the weighting values by 103 we avoid floating point and division calculations.

Similarly, in calculating the BDP, SDP and HDP, the values of $\alpha^2$, $\beta^2$ and $\gamma^2$ should be 0.012996, 0.344569 and 0.089401 respectively. We round these values and multiply by $10^4$ to get $\alpha^2 = 130$, $\beta^2 = 3446$ and $\gamma^2 = 894$ respectively. Again, floating point and division calculations are avoided. In calculating BDP, SDP and HDP, we can pre-program six items to avoid repetitive calculation:

$$A_1 = \alpha^2 . R_f . R_b$$

$$A_2 = \beta^2 . G_f . G_b$$

$$A_3 = \gamma^2 . B_f . B_b$$

$$B_1 = \alpha^2 . R_b^2$$

$$B_2 = \beta^2 . G_b^2$$

$$B_3 = \gamma^2 . B_b^2$$

Having pre-programmed the above items, it will be appreciated that all division calculations can be replaced with appropriate multiplication and addition expressions. For example, in the second embodiment, BD>0.5 can be re-written as $2.(A_1+A_2+A_3) > (B_1+B_2+B_3)$, while BDP<1.5 can be re-written as $2.(A_1+A_2+A_3) < 3.(B_1+B_2+B_3)$. When calculating SBD and HBD, the comparison steps can be realised in a similar way. For example, if we want to determine whether:

$$\frac{A_1 + A_2}{B_1 + B_2} > \frac{A_2 + A_3}{B_2 + B_3}$$

we can use $(A_1+A_2).(B_2+B_3) > (A_2+A_3).(B_1+B_2)$.

In summary, in all calculations, it is only necessary to perform integer based addition and multiplication. This makes the operation of the shadow removal stage 17 very efficient. This is particularly important in a real-time application.

The object characterisation stage 18 receives the object classification mask 39 from the shadow removal stage 19. Since this stage is not important for understanding the invention, a detailed description thereof will not be given. In summary, the object characterisation stage 18 analyses the object classification mask 39 and identifies particular features of foreground objects that may be useful in the subsequent object tracking stage 5. The output from the object characterisation stage 18 is in the form of object descriptors. Several kinds of descriptors may be generated, for example 'central position', 'dimension', 'colour' and 'pixel density'.

The object tracking stage 5 receives the object descriptors from the object characterisation stage 18. Foreground objects are tracked from frame to frame. A correspondence is established between foreground objects in the current frame, and those already tracked in previous frames, using the object descriptors. A trajectory database is maintained so that the tracking history of each foreground object is available to one or more high level applications 7. For example, a high level application 7 may display a trail line indicating the cumulative path taken by one or more foreground objects in the video. If multiple foreground objects enter the view of the web camera 11, a different colour can be assigned to each trail line for the purposes of quick identification.

An object classification application may be employed to compare the shape of each foreground object with a database of real-world objects. If a match is found, the foreground object is classified appropriately, e.g. as a 'person' or 'vehicle'.

The display of image data on the video monitor 15 is controlled by a display control application 70 stored on the hard drive of the PC 13. Referring to FIG. 17, the display control application 70 receives video data from all processing stages shown in FIG. 3, and is thereafter capable of displaying any video sequence represented by this video data. Indeed, an operator may view multiple images on a single screen. For example, an operator may wish to view both the background model 19 and the object classification mask 39 simultaneously. Of principle interest to an operator will be the post-processed video data from the object tracking stage 5 and the high level applications 7. A post-processed frame 70 is shown in FIG. 18. As a result of pixel re-classification in the shadow removal stage 17, it will be noted that pixels formerly occupying shadow regions now form part of the background. Furthermore, each foreground object 23, 25 has been identified and tracked by the object tracking stage 5. The trail lines 71, 73 represent the cumulative path taken by the objects over the course of a video segment leading up to the current frame. Each foreground object has been matched to one of a set of stored real life objects in a high-level object classification application.

Although the above-described video processing software operates on colour video data, the skilled person will appreciate that the invention is equally applicable to black and white video systems.

The invention claimed is:

1. A method of processing data representing pixels of a video frame, the pixels having been pre-classified as belonging either to a foreground or background region, the method comprising: (a) identifying one or more foreground pixels as being candidates for re-classification; (b) assigning a numerical parameter to each candidate pixel based on a predetermined relationship between the candidate pixel and a reference pixel; (c) for each candidate pixel, comparing its parameter with a first range of values and re-classifying the pixel as a background pixel if the parameter falls within the first range; (d) for each candidate pixel, comparing its parameter with a second range of values, lying within the first range, and re-classifying the pixel as a background pixel if the parameter falls within the second range; (e) providing first and second sets of updated image data including each pixel re-classified in steps (c) and (d) respectively; (f) identifying, from the second set of updated image data, a region that includes a cluster of adjacent foreground pixels; and (g) identifying, from the first set of updated image data, foreground pixels whose respective positions are within the region identified in step (f), and thereafter classifying the foreground pixels identified in step (g) as representing a common object.

2. A method according to claim 1, wherein the reference pixel referred to in step (b) is a pixel comprising part of a reference frame, the position of the reference pixel in the reference frame corresponding to the frame position of the candidate pixel.

3. A method according to claim 1, wherein the numerical parameter assigned in step (b) is calculated using a predetermined relationship between colour components of the candidate pixel and colour components of the reference pixel.

4. A method according to claim 1, wherein step (a) comprises identifying one or more foreground pixels having a luminance ($Y_f$) that is different from the luminance ($Y_b$) of the or each corresponding reference pixel.

5. A method according to claim 1, wherein the region identified in step (f) comprises a rectangular pixel array the size of which is sufficient to include each pixel of the cluster.

6. A method of processing data representing pixels of a video frame, the pixels having been pre-classified as belonging either to a foreground or background region, the method comprising: (a) identifying one or more foreground pixels as being candidates for re-classification; (b) calculating a numerical parameter for each candidate pixel based on the color component values of the candidate pixel and the color component values of a corresponding reference pixel, the reference pixel being a pixel comprising part of a reference frame, the position of the reference pixel in the reference frame corresponding to the frame position of the candidate pixel; (c) for each candidate pixel, comparing its parameter with a first range of values and re-classifying the pixel as a background pixel if the parameter falls within the first range; (d) for each candidate pixel, comparing its parameter with a second range of values, lying within the first range, and re-classifying the pixel as a background pixel if the parameter falls within the second range; (e) providing first and second sets of updated image data including each pixel re-classified in steps (c) and (d) respectively; (f) identifying, from the second set of updated image data, a region that includes a cluster of adjacent foreground pixels; and (g) identifying, from the first set of updated image data, foreground pixels whose respective positions are within the region identified in step (f), and thereafter classifying the foreground pixels identified in step (g) as representing a common object.

7. A method according to claim 6, wherein step (a) comprises identifying one or more foreground pixels having a luminance ($Y_1$) that is different from the luminance ($Y_b$) of the or each corresponding reference pixel.

8. A method according to claim 6, wherein the parameter is given by:

$$\frac{\alpha^2 \cdot R_f \cdot R_b + \beta^2 \cdot G_f \cdot G_b + \gamma^2 \cdot B_f \cdot B_b}{\alpha^2 \cdot R_b^2 + \beta^2 \cdot G_b^2 + \gamma^2 \cdot B_b^2}$$

$$\frac{\alpha^2 \cdot R_f \cdot R_b + \beta^2 \cdot G_f \cdot G_b + \gamma^2 \cdot B_f \cdot B_b}{\alpha^2 \cdot R_b^2 + \beta^2 \cdot G_b^2 + \gamma^2 \cdot B_b^2}$$

where $\alpha$, $\beta$ and $\gamma$ are luminance coefficients and where $R_f$, $G_f$, $B_f$ represent, respectively, red, green and blue color components of a foreground pixel, and $R_b$, $G_b$, $B_b$ represent, respectively, red, green and blue color components of the reference pixel.

9. A method according to claim 6, wherein the region identified in step (f) comprises a rectangular pixel array the size of which is sufficient to include each pixel of the cluster.

10. A method according to claim 6, wherein the parameter is given by:

$$\frac{R_f R_b + G_f G_b + B_f B_b}{R_b^2 + G_b^2 + B_b^2}$$

where $R_f$, $G_f$, $B_f$ represent, respectively, red, green and blue color components of a foreground pixel, and $R_b$, $G_b$, $B_b$ represent, respectively, red, green and blue color components of the reference pixel.

11. A method according to claim 10, wherein the parameter assigned in step b) is a first parameter and further comprising assigning a second parameter for the or each identified pixel based on a different relationship between color components of the candidate pixel and color components of the reference pixel, and comparing the second parameter against a second ranges of values indicating whether the pixel should be classified as a candidate pixel.

12. A method according to claim 11, wherein the second parameter is given by:

$$\text{Max}\left(\begin{array}{c} \dfrac{\alpha^2 \cdot R_f \cdot R_b + \beta^2 \cdot G_f \cdot G_b}{\alpha^2 \cdot R_b^2 + \beta^2 \cdot G_b^2}, \\ \dfrac{\beta^2 \cdot G_f \cdot G_b + \gamma^2 \cdot B_f \cdot B_b}{\beta^2 \cdot G_b^2 + \gamma^2 \cdot B_b^2}, \\ \dfrac{\alpha^2 \cdot R_f \cdot R_b + \gamma^2 \cdot B_f \cdot B_b}{\alpha^2 \cdot R_b^2 + \gamma^2 \cdot B_b^2} \end{array}\right)$$

where $\alpha$, $\beta$ and $\gamma$ are luminance coefficients and where $R_f$, $G_f$, $B_f$ represent, respectively, red, green and blue color components of a foreground pixel, and $R_b$, $G_b$, $B_b$ represent, respectively, red, green and blue color components of the reference pixel.

* * * * *